(No Model.)

P. LOBBEN.
BALL BEARING FOR SHAFTS.

No. 503,609. Patented Aug. 22, 1893.

Witnesses
Chas. F. Schmelz.
H. M. Fowler.

Inventor
Peder Lobben,
By his Attorney
Rufus B. Fowler.

UNITED STATES PATENT OFFICE.

PEDER LOBBEN, OF WORCESTER, MASSACHUSETTS, ASSIGNOR TO IVER JOHNSON, OF SAME PLACE.

BALL-BEARING FOR SHAFTS.

SPECIFICATION forming part of Letters Patent No. 503,609, dated August 22, 1893.

Application filed December 5, 1888. Serial No. 292,739. (No model.)

*To all whom it may concern:*

Be it known that I, PEDER LOBBEN, a citizen of the United States, and a resident of Worcester, in the county of Worcester and State of Massachusetts, have invented certain new and useful Improvements in Ball-Bearings for Shafts, of which the following is a specification, reference being had to the accompanying drawings, forming a part of the same and illustrating the embodiment of my invention as applied to the bearing of a shaft, and also as adapted to the bearings of a bicycle.

My invention relates to that class of bearings, in which the pressure upon the shaft is received in a line coincident with its radius, and it has for its objects: first, to provide means of adjustment by which the lost motion, resulting from wear or other causes can be taken up equally and simultaneously upon opposite sides of the balls, thereby preventing the lateral displacement of the balls, or the longitudinal movement of the shaft relatively to its inclosing bearing; second, to maintain an equal and uniform pressure upon the opposite sides of the balls; third, to support the load, so that its pressure shall be received upon the balls in a line always parallel with the radii of the shaft; fourth, to maintain the outer and inner tracks of each row of balls in true alignment and in a plane parallel with the radii of the shaft, in those bearings in which more than a single row of balls are used, and fifth to maintain the adjustable parts of the bearing in a fixed position.

Figure 1:
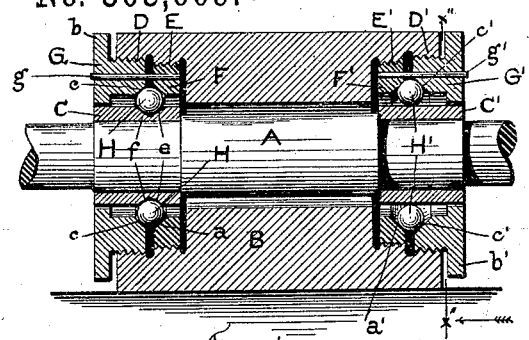
Figure 2:
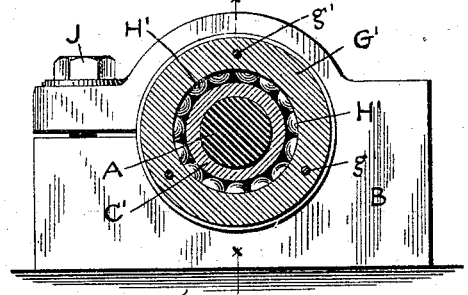
Figure 3:
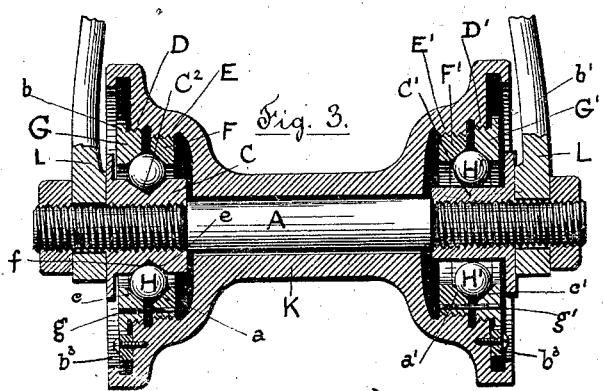
Figure 4:
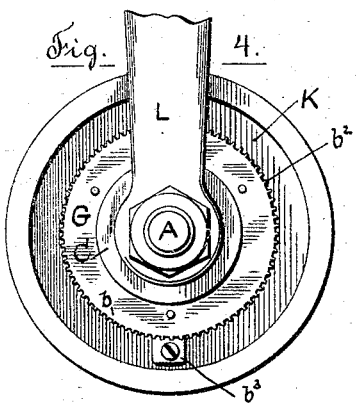
Figure 5:
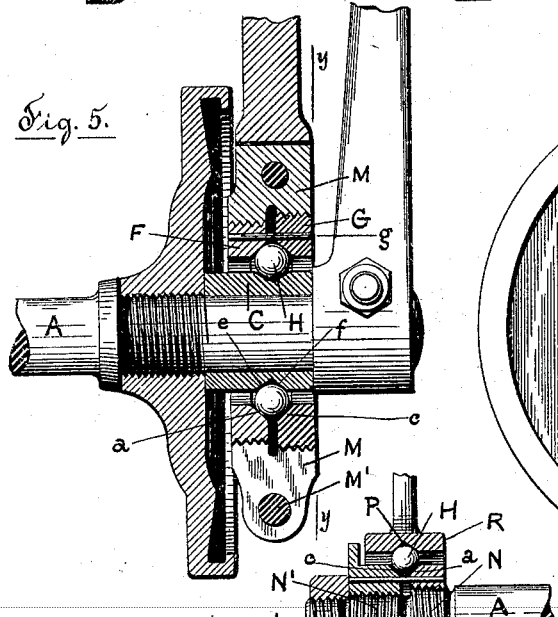
Figure 6:
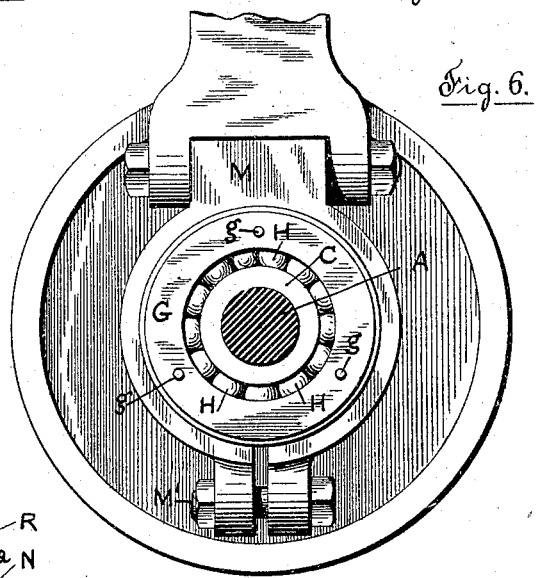
Figure 7:
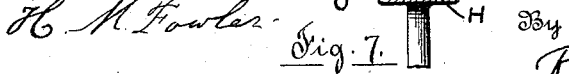

Figure 1 of the accompanying drawings represents in vertical sectional view, taken on line X, X, Fig. 2, the journal bearing of a shaft with the load upon the shaft supported upon two rows of balls. Fig. 2 is an end and sectional view of the same, the section being taken on line X″, X″, Fig. 1. Fig. 3 represents a vertical and longitudinal view of the rear bearing of a bicycle. Fig. 4 is an end view of the same. Fig. 5 is a vertical central sectional view of one of the forward bearings of a bicycle. Fig. 6 is an end view of the same, the crank having been removed in line Y, Y, Fig. 5, and Fig. 7 represents a modification in the construction of a ball bearing, which however embodies the essential features of, my invention as embodied in a bearing employing but a single row of balls.

Referring to the drawings A denotes a section of a shaft inclosed within a journal bearing or box B.

C denotes a sleeve, which is provided with a V shaped groove and so attached to the shaft A as to rotate with it. At the opposite end of the box B a sleeve C′, having a plain cylindrical outer surface, is similarly attached to the shaft A. The opposite ends of the box B are provided with the screw-threaded sections D, D′, having a right hand screw thread; and also with the screw threaded section E, E′ of a less diameter than the sections D, D′ and having a left hand screw thread. In the screw-threaded section E is placed a screw-threaded ring F, having a beveled edge $a$, and in the screw-threaded section D is placed a screw-threaded ring G, preferably provided with a flange $b$ and having a beveled edge $c$.

The sides $a$ and $c$ and also the sides $e$ and $f$ of the V shaped groove in the sleeve C are equally inclined to the axis of the shaft A and the vertices of the angles formed by the sides $a$, $c$ and the sides $e$, $f$ are in the same plane. Between the inclined sides $a$, $c$, $e$ and $f$, which serve as tracks, are placed the hardened balls H, forming an anti-frictional bearing between the shaft and box by the rolling contact of the balls upon the inner track $e$, $f$ and the outer track $a$, $c$. The screw-threaded rings D and E are united by pins $g$, in order to secure the simultaneous rotation of the ring E by the rotation of the ring D by means of the flange $b$. Similar screw-threaded rings F′ and G′ are held in the screw-threaded sections D′ and E′, united by the pins $g'$ and provided with the beveled sides $a'$, $c'$ between which and the cylindrical outer surface of the sleeve C′ are the hardened balls H′. The rings F′, G′ are adjusted in the same manner as the rings F, G by turning the outer ring G′ by its attached flange $b'$ and through the pins $g'$ simultaneously rotating the ring F', the rotation of the rings F, G and F', G' in one direction serving to bring the rings toward each other and against the balls H, H', and their rotation in the opposite direction serving to move the rings from each other and away from the balls H, H'.

Instead of providing V shaped grooves for the balls H and H', I cause the balls H' to run on a plain cylindrical surface and hold them to substantially a uniform path around the cylindrical surface of the sleeve C' by the inclosing rings F', G' held in the rigid box B, the shaft A being held from any longitudinal movement by the balls H running in the V shaped groove in the sleeve C. The balls H' are thus enabled to choose their own track upon the surface of the sleeve C' as determined by the distance between the two planes containing the vertices of the angles formed by the beveled sides of the rings F, G and F', G', thereby doing away with the necessity of an accurate adjustment of two inner V shaped tracks in both the sleeve C and the sleeve C'. Whenever it is necessary to adjust either end of the bearing on account of the wear of the surfaces in contact, the outer of the rings are turned to the right and thereby carried toward the balls by their screw-threaded surfaces turning in the screw-threaded sections D, D'; likewise the inner rings are rotated to the right and carried toward the balls by their left hand screw-threaded surfaces turning in the left hand screw-threaded sections D', E'. Both inner and outer rings are thus moved simultaneously and equally toward the balls, maintaining an equal pressure upon the opposite sides of the balls and without exerting any strain upon the shaft in the line of its longitudinal movement.

The box B, I preferably make in the form shown in Fig. 2, having one side open and drawn together by the bolt J, thereby clamping the screw-threaded rings after their accurate adjustment and securely holding them in position.

In Figs. 3 and 4 I have shown the application of my improved bearing to the rear wheel of a bicycle, in which the shaft A is shown as being held stationary and the hub K as rotating. The construction and operation of the several parts which embody my invention are, however, similar; the shaft A is provided with sleeves C, C', the former having a V shaped groove C² and the latter having a plain cylindrical surface. Rings G, G' having right hand screw threads and rings F, F' having left hand screw-threads are respectively held in the right and left hand screw-threaded sections D, D' and E, E', and the outer and inner rings are caused to rotate simultaneously by means of the pins g, g'. The flange b of the outer rings are provided with teeth b² which are engaged by corresponding teeth upon the edge of a plate b³ attached to the hub K, serving as a dog to cause the screw-threaded rings to rotate with the hub K.

In the application of my invention to the rear bearing of a bicycle as shown in Figs. 3 and 4, the load is carried upon the shaft A to which the fork L, L is attached and the pressure is brought upon the balls as they pass beneath the shaft and in a line at right angles to the axis of the shaft A, and it will be obvious that in order to maintain an equal pressure upon the sides of the inner and outer tracks and prevent a lateral strain upon the sides of the balls parallel with the axis of the shaft A, the vertices of the angles formed by the sides a, c and e, f, Fig. 3 must lie in the same vertical plane and this is secured by the equal and simultaneous movement of the adjusting screw-threaded rings F and G toward the balls H.

In Figs. 5 and 6 a similar construction and arrangement of parts are shown illustrating the application of my invention to the forward bearing of a bicycle, and in which the adjusting rings are shown as being held in position by means of the outer case M being clamped by a screw bolt M', which, however, need not supersede the additional use of a dog if desired.

In Fig. 7 my invention is shown as applied to a revolving pulley rotating about a fixed shaft, which is provided with a screw-threaded section N having a right hand screw thread and a screw-threaded section N' having a left hand screw thread. Upon these sections are placed the right and left hand screw-threaded adjusting rings O, O', united by the pins h in order to secure their simultaneous rotation, and provided with the beveled sides a, c forming the inner track for the balls H which run upon an outer track, formed by the V shaped slot P in the hub of the pulley R. The end of the shaft A is screw-threaded at j to receive a nut j' which is screwed against the outer end of the screw-threaded adjusting ring O' and acting as a check nut to hold the adjusting rings from independent rotation upon the shaft.

What I claim as my invention, and desire to secure by Letters Patent, is—

1. In a ball bearing, the combination, with a shaft and an inclosing box, of two series of balls arranged in annular rings around said shaft and interposed between said shaft and its inclosing box, an outer and an inner V shaped track upon which one of the series of balls run, and an outer and an inner track upon which the second series of balls run, one of said tracks being V shaped and the other of said tracks presenting a plain cylindrical surface parallel with the axis of the shaft, said outer V shaped tracks being adjustable in a direction parallel with the axis of said shaft, substantially as described.

2. In a ball bearing the combination with a shaft, of a series of balls arranged concentrically around said shaft, annular rings placed upon opposite sides of said balls and provided with inclined surfaces resting against said balls the outer surfaces of said annular rings being provided respectively with right and left hand screw threads an inclosing box provided with right and left hand screw threads engaging said annular rings, said annular rings being made of different diameters, substantially as described.

PEDER LOBBEN.

Witnesses:
 IVER JOHNSON,
 RUFUS B. FOWLER.